United States Patent
Hayashi (10) Patent No.: US 11,181,896 B2
(45) Date of Patent: Nov. 23, 2021

(54) DIAGNOSING APPARATUS, DIAGNOSING METHOD, AND COMPUTER READABLE MEDIUM STORING DIAGNOSING PROGRAM

(71) Applicant: Yokogawa Electric Corporation, Tokyo (JP)

(72) Inventor: Shunsuke Hayashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 310 days.

(21) Appl. No.: 16/264,685

(22) Filed: Feb. 1, 2019

(65) Prior Publication Data

US 2019/0250595 A1 Aug. 15, 2019

(30) Foreign Application Priority Data

Feb. 9, 2018 (JP) .............................. JP2018-022103

(51) Int. Cl.
G05B 23/02 (2006.01)
G06F 11/18 (2006.01)
G06F 11/30 (2006.01)
G06F 11/34 (2006.01)

(52) U.S. Cl.
CPC ....... *G05B 23/024* (2013.01); *G05B 23/0237* (2013.01); *G06F 11/183* (2013.01); *G06F 11/187* (2013.01); *G06F 11/3013* (2013.01); *G06F 11/3058* (2013.01); *G06F 11/3452* (2013.01)

(58) Field of Classification Search
None
See application file for complete search history.

(56) References Cited

U.S. PATENT DOCUMENTS 5,993,055 A 11/1999 Williams
2019/0106134 A1 4/2019 Eckelmann-Wendt

FOREIGN PATENT DOCUMENTS

| JP | S63104101 A | 5/1988 |
| JP | 2003140707 A | 5/2003 |
| JP | 2009009557 A | 1/2009 |
| JP | 2016192158 A | 11/2016 |

OTHER PUBLICATIONS

Extended European Search Report issued for counterpart European Application No. 19155309.8, issued by the European Patent Office dated Jul. 3, 2019.
Office Action issued for counterpart Japanese Application No. 2018-022103, issued by the Japan Patent Office dated Oct. 12, 2021 (drafted on Oct. 8, 2021).

*Primary Examiner* — Sean Shechtman (57) ABSTRACT

An abnormality is diagnosed in a control system including a plurality of controllers adopting a redundant configuration, a diagnosing apparatus that diagnoses a control system. The control system includes a plurality of controllers adopting a redundant configuration; and an interface apparatus that outputs control output data, which is based on a plurality of redundant pieces of control data received from the plurality of controllers, to a device under control. The diagnosing apparatus includes a statistical information acquiring section that acquires statistical information including adoption/non-adoption of the control data from each of the plurality of controllers in the interface apparatus; and a diagnosing section that diagnoses the control system based on the statistical information.

16 Claims, 7 Drawing Sheets

| # | DATE AND TIME | I/F ID | CONTROL ADDRESS | CONTROLLER 1 | CONTROLLER 2 | CONTROLLER 3 |
|---|---|---|---|---|---|---|
| ... | ... | ... | ... | ... | ... | ... |
| X | 2018/01/04 15:30:11 | 1 | 8F7C | ADOPTION | ADOPTION | ADOPTION |
| ... | ... | ... | ... | ... | ... | ... |
| Y | 2018/01/04 16:37:05 | 2 | 4380 | ADOPTION | NON-ADOPTION | ADOPTION |
| ... | ... | ... | ... | ... | ... | ... |
| Z | 2018/01/04 17:28:30 | 1 | 2950 | ADOPTION | TIME OUT | ADOPTION |
| ... | ... | ... | ... | ... | ... | ... |

DIAGNOSING APPARATUS, DIAGNOSING METHOD, AND COMPUTER READABLE MEDIUM STORING DIAGNOSING PROGRAM

The contents of the following Japanese patent application(s) are incorporated herein by reference:
No. 2018-022103 filed in JP on Feb. 9, 2018

BACKGROUND

1. Technical Field

The present invention relates to a diagnosing apparatus, a diagnosing method, and a computer readable medium storing a diagnosing program.

2. Related Art

Patent Document 1 describes process control for, in a process control apparatus used for process control in a plant or the like, making a majority determination of control calculation results of three or more controllers operating in parallel.

Patent Document 1: Japanese Patent Application Publication No. 2003-140707

The process control apparatus disclosed in Patent Document 1 makes a majority determination of control calculation results of three or more controllers within the process control apparatus, and then transmits control data to a processing machine. However, the process control apparatus disclosed in Patent Document 1 has a low tolerance for malfunction or intermittent malfunction of a process device interface 30 that performs the majority determination.

SUMMARY

Therefore, it is an object of an aspect of the innovations herein to provide a diagnosing apparatus, a diagnosing method, and a computer readable medium storing thereon a diagnosing program, which are capable of overcoming the above drawbacks accompanying the related art. The above and other objects can be achieved by combinations described in the claims. According to a first aspect of the present invention, provided is diagnosing apparatus that diagnoses a control system, wherein the control system includes a plurality of controllers adopting a redundant configuration; and an interface apparatus that outputs control output data, which is based on a plurality of redundant pieces of control data received from the plurality of controllers, to a device under control, and the diagnosing apparatus comprises a statistical information acquiring section that acquires statistical information including adoption/non-adoption of the control data from each of the plurality of controllers in the interface apparatus; and a diagnosing section that diagnoses the control system based on the statistical information.

According to a second aspect of the present invention, provided is A diagnosing method for diagnosing a control system with a computer, wherein the control system includes a plurality of controllers adopting a redundant configuration; and an interface apparatus that outputs control output data, which is based on a plurality of redundant pieces of control data received from the plurality of controllers, to a device under control, the computer acquires statistical information including adoption/non-adoption of the control data from each of the plurality of controllers in the interface apparatus, and the computer diagnoses the control system based on the statistical information.

According to a third aspect of the present invention, provided is a computer readable medium on which is stored a diagnosing program that causes a computer to function as a diagnosing apparatus that diagnoses a control system, wherein the control system includes a plurality of controllers adopting a redundant configuration; and an interface apparatus that outputs control output data, which is based on a plurality of redundant pieces of control data received from the plurality of controllers, to a device under control, and the diagnosing program causes the computer to function as a statistical information acquiring section that acquires statistical information including adoption/non-adoption of the control data from each of the plurality of controllers in the interface apparatus, and a diagnosing section that diagnoses the control system based on the statistical information.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
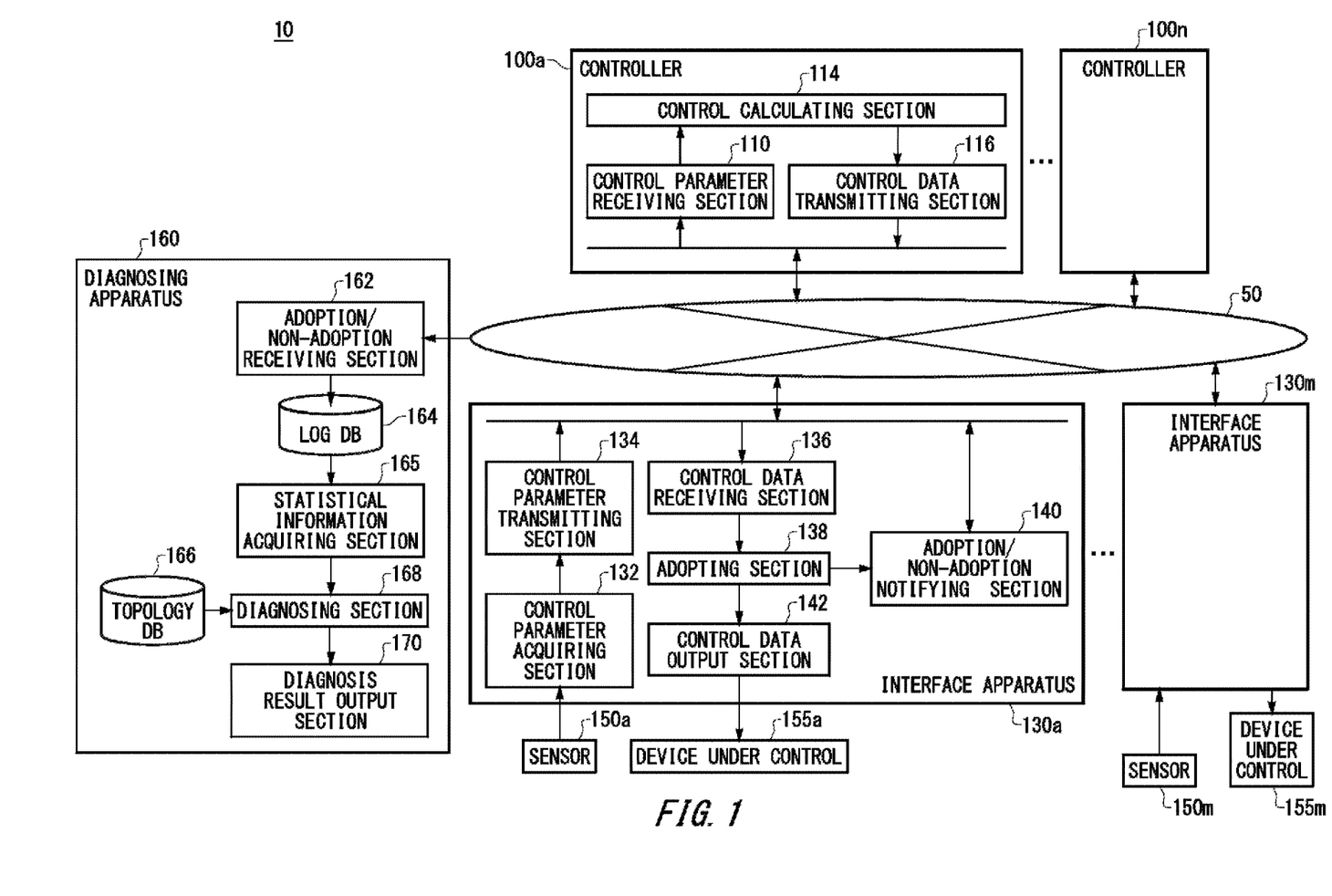
FIG. 1 shows a configuration of the control system 10 according to the present embodiment.

FIG. 1 shows a configuration of a control system 10 according to the present embodiment. The control system 10 controls a manufacturing plant that manufactures chemical products, metal products, petroleum, gas, or the like. Instead, the control system 10 may be used to control another type of plant such as a power plant, or may be used to control a facility in a building or transportation facility.

The control system 10 controls a plurality of devices under control 155a to 155m (also referred to as "devices under control 155") according to sense data from a plurality of sensors 150a to 150m (also referred to as "sensors 150") provided at each location such in the plant or the like, and performs manufacturing, power generation, and/or control corresponding to the objective of the plant or the like. The control system 10 according to the present embodiment adopts or does not adopt control data from the plurality of controllers 100a to 100n having a redundant configuration, on the side of interface apparatuses 130a to 130m connected to the devices under control 155a to 155m, and diagnoses the control system 10 using statistical information including the adoption/non-adoption results with a diagnosing apparatus 160. In this way, the control system 10 can statistically diagnose abnormal locations therein.

Each sensor 150 measures a physical quantity indicating a state of the plant or the like that is the control target, and supplies the interface apparatus 130 with the sense data corresponding to the physical quantity. As an example, each sensor 150 may be a temperature sensor, a pressure sensor, a flow meter, a current sensor, a voltage sensor, a gas sensor, or a measuring unit that measures any other physical quantities.

Each device under control 155 controls and/or adjusts the operation of the plant or the like that is the control target. As an example, each device under control 155 may be an actuator such as a valve, compressor, pump, or motor provided to the plant or the like that is the control target, or may be an element, circuit, device, or the like that applies an electrical or magnetic signal to an apparatus provided to the plant or the like that is the control target.

The control system 10 includes a plurality of controllers 100a to 100n (also referred to as "controllers 100"), interface apparatuses 130a to 130m (also referred to as "interface apparatuses 130") connected to the sensors 150a to 150m and devices under control 155a to 155m, the diagnosing apparatus 160, and a network 50.

The plurality of controllers 100 have a redundant configuration. The plurality of controllers 100 perform the same control calculation operations as each other, based on control parameters such as the sense data received from one or more sensors 150, and transmit control data for controlling one or more devices under control 155 to one or more interface apparatuses 130. In the present embodiment, the control system 10 includes three or more controllers 100, and adopts the majority decision among the pieces of control data output by the controllers 100.

The plurality of controllers 100 are synchronized with a predetermined control period, and each controller 100 transmits the control data to the interface apparatus 130 which the target device under control 155 is connected to. It is assumed that the control period is common to the entire control system 10, for ease of explanation. Instead, the control period may be set independently for each group of devices under control 155, each individual device under control 155, or each control target parameter in each device under control 155. In this case, the plurality of controllers 100 are synchronized with a control period corresponding to each target of the control data, and transmit the control data to each target. Here, synchronization is not limited to a precise period such as a clock period, and may be such a loose period that the control data can reach the target within that control period.

Each controller 100 includes a control parameter receiving section 110, a control calculating section 114, and a control data transmitting section 116.

The control parameter receiving section 110 receives the control parameters such as the sense data from one or more sensors 150, via the interface apparatuses 130a to 130m and the network 50.

The control calculating section 114 performs control calculation for controlling the plant or the like that is the control target of the control system 10. For each target to which control data is to be transmitted, the control calculating section 114, in each control period, performs the control calculation process that receives a value of a control parameter input from the control parameter receiving section 110 as input, and that outputs control data such as a manipulation amount and/or setting value for the target. In the control system 10 according to the present embodiment, a configuration is adopted in which each interface apparatus 130 transmits a control parameter that has the same value in each control period, to the plurality of controllers 100. Therefore, as a result of receiving the control parameter having the same value in each control period as input and performing the control calculation process with the same algorithm, each control calculating section 114 of the plurality of controllers 100 outputs control data having the same value, if there are no abnormalities. As an example, the control calculation process may be control in control engineering such as PI control or PID control, or may be an arbitrary control algorithm including condition judgment, conditional branching, or the like.

The control data transmitting section 116 transmits the control data output by the control calculating section 114 to the interface apparatus 130 to which the target device under control 155 is connected.

One or more interface apparatuses 130 are connected to one or more sensors 150 and one or more devices under control 155, and function as interfaces between each controller 100 and the sensor 150 and device under control 155 connected to the corresponding interface apparatus 130. The control system 10 may include an interface apparatus 130 to which a sensor 150 is connected but a device under control 155 is not connected, and/or an interface apparatus 130 to which a sensor 150 is not connected but a device under control 155 is connected. In the present embodiment, an example is shown in which one sensor 150 and one device under control 155 are connected to each interface apparatus 130, for ease of explanation. Instead, each interface apparatus 130 may adopt a configuration in which the interface apparatus 130 is connected to a plurality of sensors 150 and/or a plurality of devices under control 155.

Each interface apparatus 130 includes a control parameter acquiring section 132, a control parameter transmitting section 134, a control data receiving section 136, an adopting section 138, an adoption/non-adoption notifying section 140, and a control data output section 142.

The control parameter acquiring section 132 acquires the control parameter such as the sense data from the sensor 150 to the corresponding interface apparatus 130. Furthermore, the control parameter acquiring section 132 may acquire, as the control parameter, various pieces of data used by the control calculating section 114 to perform the control calculation, such as a setting parameter of the device under control 155.

The control parameter transmitting section 134 transmits the control parameter acquired by the control parameter acquiring section 132 to each controller 100. In the present embodiment, the control parameter transmitting section 134 transmits the control parameter having the same value in each control period to a plurality of controllers 100. For example, the control parameter acquiring section 132 may acquire the control parameter in synchronization with the control period, and may provide the control parameter transmitting section 134 with the control parameter having the same value during each control period.

The control data receiving section 136 receives the control data from each controller 100 for the device under control 155 connected to the interface apparatus 130. Here, since the plurality of controllers 100 adopt a redundant configuration, each control data receiving section 136 receives a plurality of pieces of control data that have been made redundant, i.e. control data having the same value if the data is normal, from the plurality of controllers 100 in each control period.

The adopting section 138 determines whether to adopt or not adopt each of the plurality of redundant pieces of control data, in each control period. As an example, on a condition that at least a predetermined number of pieces of control data are the same value, the adopting section 138 adopts this control data as the control output data to be output to the device under control 155, and does not adopt the pieces of control data having different values. For example, in a case where there are three controllers 100, the adopting section 138 adopts this control data if two or more pieces of control data have the same value. Here, the adopting section 138 does not adopt pieces of control data whose values differ from the adopted control data.

The adoption/non-adoption notifying section 140 notifies the adoption/non-adoption receiving section 162 inside the diagnosing apparatus 160 about adoption/non-adoption information indicating adoption or non-adoption of the control data from each of the plurality of controllers 100.

The control data output section 142 outputs the control output data to be output to the device under control 155, which was generated based on the plurality of redundant pieces of control data, to the target device under control 155.

The diagnosing apparatus 160 gathers the adoption/non-adoption information received from one or more interface apparatuses 130, and records statistical information including the adoption or non-adoption of the control data from each of the plurality of controllers 100. The diagnosing apparatus 160 then diagnoses the control system 10 based on the statistical information. The diagnosing apparatus 160 includes an adoption/non-adoption receiving section 162, a log DB 164, a statistical information acquiring section 165, a topology DB 166, a diagnosing section 168, and a diagnosis result output section 170.

The adoption/non-adoption receiving section 162 receives the adoption/non-adoption information indicating adoption or non-adoption of the control data from each of the plurality of interface apparatuses 130, and records this adoption/non-adoption information in the log DB 164 (log database 164).

The log DB 164 consecutively stores the adoption/non-adoption information of a plurality of control periods, which the adoption/non-adoption receiving section 162 receives from each of the plurality of interface apparatuses 130, as the log information.

The statistical information acquiring section 165 acquires various types of statistical information including the adoption or non-adoption of the control data from each of the plurality of the controllers 100 in one or more interface apparatuses 130, from the log information stored in the log DB 164. For example, the statistical information acquiring section 165 references the log information and calculates various types of statistical information such as the number of times that control data is not adopted from each controller 100 and the number of times that the control data is not adopted by each interface apparatus 130.

The topology DB 166 stores topology information of the network 50. The topology information is information indicating the connection relationship of the network between the plurality of controllers 100 and the plurality of interface apparatuses 130, and is information indicating a network structure that can be used to diagnose abnormality locations in the network 50, such as information relating to each link located between each controller 100 and each interface apparatus 130 and/or information relating to whether each link is multiplexed. If the topology information of the network 50 is not used in the diagnosis of abnormality locations, the diagnosing apparatus 160 may adopt a configuration that does not include the topology DB 166.

The diagnosing section 168 diagnoses the control system 10 based on the statistical information acquired by the statistical information acquiring section 165. The diagnosing section 168 according to the present embodiment estimates the abnormality locations in the network 50, based on the topology information stored in the topology DB 166 in addition to the statistical information. Here, the diagnosing section 168 does not immediately judge a controller 100 to be abnormal in response to the control data from this controller 100 in a certain control period being non-adopted, and instead estimates an abnormality by performing a statistical judgment using the statistical information that includes the adoption/non-adoption information from the plurality of interface apparatuses 130 and/or the adoption/non-adoption information in a plurality of control periods. By using statistical information, the diagnosing section 168 can identify whether the non-adoption of the control data is caused by either a permanent malfunction or a temporary abnormality and/or accurately narrow in on the abnormality location within the control system 10. Instead, the diagnosing section 168 can be configured to diagnose abnormalities using the adoption/non-adoption information in each control period, without using the statistical information, in order to simplify the diagnosis. For example, the diagnosing section 168 may immediately judge a controller 100 to be abnormal in response to the control data from this controller 100 in a certain control period being non-adopted.

The diagnosis result output section 170 outputs the diagnostic result obtained by the diagnosing section 168.

The network 50 is a general or specialized network to which the plurality of controllers 100, the plurality of interface apparatuses 130, and the plurality of diagnosing apparatuses 160 are connected. In the present embodiment, each controller 100 may be a computer such as a PC (a personal computer), a work station, a server computer, or a general computer, and functions as the controller 100 by executing a control program on a computer. Instead, each controller 100 may be a specialized computer designed to control a plant or the like, and may be specialized hardware realized by specialized circuitry. Furthermore, each interface apparatus 130 may be a specialized apparatus, including a microcontroller or the like, that is designed to control a plant or the like; an apparatus obtained by attaching, to a general computer, an interface circuit for connecting to a sensor 150 and/or device under control 155; or specialized hardware realized by specialized circuitry. The diagnosing apparatus 160 as well may be a general computer or specialized computer, and may function as the diagnosing apparatus 160 by executing a diagnosing program on the computer. Instead, the diagnosing apparatus 160 may be realized by specialized hardware. The network 50 may be a wired or wireless network including Ethernet (Registered Trademark), LAN, WAN, the Internet, and/or the like, and may be configured to include an industrial network. The network 50 may realize communication between the controllers 100, the interface apparatuses 130, and the diagnosing apparatuses 160 by transmitting network packets.

Instead of the above, the control system 10 may be a computer housed in a single case. In other words, each controller 100 may be realized by execution of a program on a processor of the computer, and each interface apparatus 130 may be implemented as an I/O apparatus of the computer. Furthermore, each controller 100 may be implemented as a virtual machine executed by one or more processors. In such a configuration, the control system 10 does not include the network 50 that is a general or specialized network, and the controllers 100 and interface apparatuses 130 can be connected using a chip set such as memory controller hub and I/O controller hub providing a connection between the processor and I/O apparatus.

Figure 2:
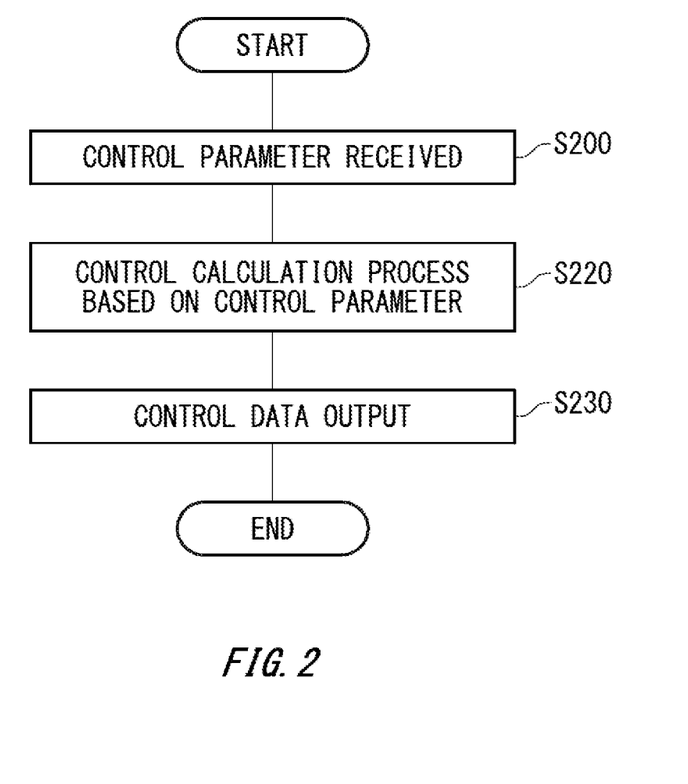
FIG. 2 shows an operational flow of a controller 100 according to the present embodiment.

FIG. 2 shows an operational flow of a controller 100 according to the present embodiment. As an example in this drawing, the operational flow of one control period for one control process, from among one or more control processes performed by the controller 100, is shown. For each of a plurality of control operations performed periodically with control periods having the same or different lengths, each controller 100 may perform the operational flow of this drawing in parallel or concurrently, and may control one or more devices under control 155 that are targets of each control operation.

At S200 (step 200), the control parameter receiving section 110 receives one or more control parameters to be used in a control process, from the interface apparatus 130 that acquires each control parameter. The control parameter receiving section 110 issues read access or a read request for the control parameter to the target interface apparatus 130, and receives the control parameter that is returned from the control parameter transmitting section 134 in the target interface apparatus 130. Here, the control parameter that is the reading target is designated using identification information such as an address in a global address space of the control system 10, a register identifier (an ID, e.g. an identification number or identification name such as a tag name) in a global register space, or a pair of an identifier of an interface apparatus 130 and an address (register identifier) in a local address (register) space of this interface apparatus 130. Here, the identifier of the interface apparatus 130 may be expressed using information identifying a node in the network, such as an IP address. The read access or read request may include, in addition to the identification information of the control parameter, identification information, the control period, and/or the like of the requesting controller 100.

Instead, the control parameter transmitting section 134 in the interface apparatus 130 may, in each control period, transmit the control parameter received by the control parameter acquiring section 132 to the control parameter receiving section 110 that uses this control parameter, and the control parameter receiving section 110 may receive the control parameter that is transmitted thereto. The information transmitted by the control parameter transmitting section 134 may include, in addition to a control parameter value, identification information of the control parameter, identification information of the destination controller 100, the control period, and/or the like.

At S220, the control calculating section 114 performs the control calculation process for outputting the control data to the target one or more devices under control 155, using the one or more control parameter values input from the control parameter receiving section 110 as input parameters. If the plurality of controllers 100 are operating normally, the plurality of control calculating sections 114 output the pieces of control data having the same value in response to the control parameters having the same value being input.

At S230, the control data transmitting section 116 transmits the control data output by the control calculating section 114 to one or more devices under control 155 that are control targets. The control data transmitting section 116 issues writing access or a writing request for the control data to the interface apparatus 130 to which the device under control 155 that is the control target is connected, and writes the control data to a register or memory within this interface apparatus 130. Such writing access or a writing request can include identification information of a destination of the control data defined in the same manner as the identification information of the control parameter, identification information of the requesting controller 100, the operation period, and/or the like.

Figure 3:
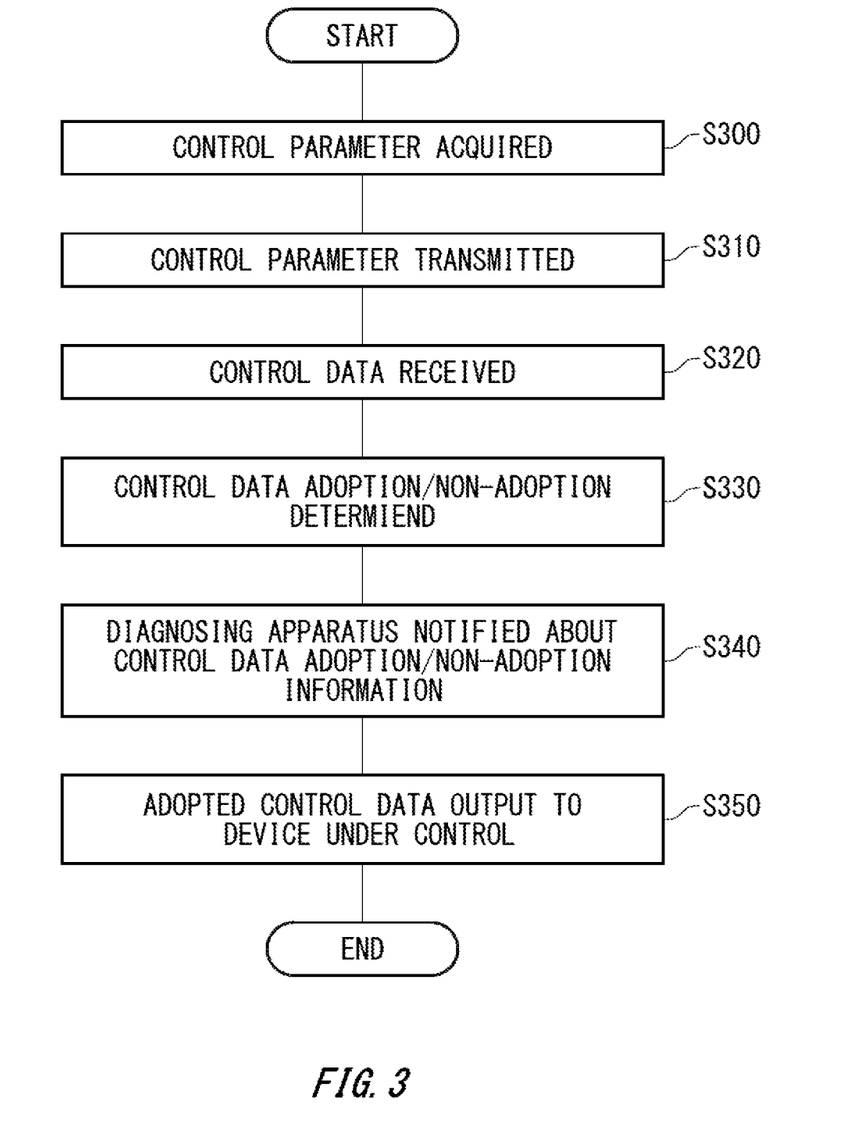
FIG. 3 shows an operational flow of an interface apparatus 130 according to the present embodiment.

FIG. 3 shows an operational flow of an interface apparatus 130 according to the present embodiment. As an example in this drawing, the operational flow of an interface apparatus 130 corresponding to one control period for one control process, from among one or more control processes performed by the controller 100, is shown. Each interface apparatuses 130 may each perform the operational flow of this drawing in in parallel or concurrently, in correspondence with each of a plurality of control operations performed periodically by each controller 100 in control periods having the same or different lengths, and may perform a process of input from a sensor 150 and a process of output to a device under control 155.

At S300, the control parameter acquiring section 132 acquires the control parameter such as the sense data from the sensor 150 connected thereto. Furthermore, the control parameter acquiring section 132 may acquire an arbitrary parameter that can be accessed by the controller 100, such as a setting parameter of the device under control 155 to be used in the control process performed by the controller 100, in response to a request from the controller 100. The control parameter acquiring section 132 may acquire the control parameter in response to the control parameter transmitting section 134 receiving the read access or read request from the controller 100, or may acquire the control parameter with a sampling period (e.g. a sampling period that is shorter than the control period) that is independent from the control period.

At S310, the control parameter transmitting section 134 transmits the control parameter acquired by the control parameter acquiring section 132 to the controller 100 that is to use this control parameter. The control parameter transmitting section 134 may return the target control parameter in response to the read access or read request from the controller 100, or may transmit the target control parameter at a predetermined period to the one or more controllers 100 that are destinations set in advance for each control parameter.

At S320, the control data receiving section 136 receives the plurality of redundant pieces of control data, which are transmitted by respective controllers 100.

At S330, the adopting section 138 determines adoption/non-adoption for each of the plurality of redundant pieces of control data. Here, if the interface apparatus 130 receives a plurality of types of control data due to a plurality of devices under control 155 being connected to the interface apparatus 130, for example, the adopting section 138 determines adoption/non-adoption for pieces of control data having the same target. On a condition that at least a predetermined number of pieces of control data are the same, the adopting section 138 according to the present embodiment sets this control data to be control output data that is to be output to the device under control 155. The adopting section 138 may determine the control output data to be output to the device under control 155 according to a majority determination of the plurality of pieces of data, or may select the control output data on a condition that the value of the pieces of control data selected by the majority determination is the same for at least a predetermined number of pieces of control data. For example, with the predetermined number described above being two in a case where the number of controllers 100 is five, if three of the controllers 100 output control data "a" and two of the controllers 100 output control data "b", the control data "a" is set as the control output data. If two of the controllers 100 output the control data "a" and the remaining controllers 100 each output separate control data differing from the control data "a", the control data "a" is set as the control output data. If two or more of the controllers 100 do not output control data having the same value, none of the control data is adopted. In this example, the control system 10 can continue normal operation even when up to three controllers 100 malfunction or enter a maintenance state.

The adopting section 138 may judge a piece of control data to have timed out, and not adopt this control data, in response to a condition that the control data from some of the controllers 100 could not be received during a predetermined time out period from a reference timing such as the start timing of the control period or the timing at which the first piece of control data is received.

At S340, the adoption/non-adoption notifying section 140 notifies the diagnosing apparatus 160 about the adoption/non-adoption information indicating adoption/non-adoption of the control data from each of the plurality of controllers 100. The adoption/non-adoption notifying section 140 according to the present embodiment buffers the adoption/non-adoption information and notifies the diagnosing apparatus 160 about the adoption/non-adoption information by sending back the adoption/non-adoption information in response to receiving the read access or read request for the adoption/non-adoption information from the diagnosing apparatus 160. The diagnosing apparatus 160 can also periodically exchange the read access and the like for the adoption/non-adoption information and the response thereto with the interface apparatus 130, and use this communication as a heartbeat from the interface apparatus 130. Instead, the destination of the diagnosing apparatus 160 can be registered in advance in the adoption/non-adoption notifying section 140, and the adoption/non-adoption notifying section 140 may actively notify the diagnosing apparatus 160 about only the adoption or only the non-adoption, to reduce the amount of traffic on the network 50. The adoption/non-adoption notifying section 140 may notify the diagnosing apparatus 160 about the adoption/non-adoption information in each control period in response to a request from the diagnosing apparatus 160, or may notify the diagnosing apparatus 160 after accumulating the adoption/non-adoption information for a plurality of control periods.

At S350, the control data output section 142 outputs the control output data based on the plurality of redundant pieces of control data to the target device under control 155. The control data output section 142 according to the present embodiment outputs the control output data as-is to the target device under control 155. Instead, in a case where the control period of the controller 100 is greater than the operational period of the device under control 155 and/or the interface apparatus 130, for example, the control data output section 142 may extrapolate the control output data received in each control period of the controller 100 and consecutively output the resulting control output data to the device under control 155.

The interface apparatus 130 can control the device under control 155 in each control period adapted to the device under control 155, by performing the operational flow of the present drawing in each control period.

At S330 described above, a case can be imagined in which the adopting section 138 does not adopt any of the control data, due to the adoption conditions. For example, a method can be implemented in which the adopting section 138 does not adopt any of the control data if all of the values of the pieces of control data are different from each other in a majority decision adoption. In such a case, at S340 above, the adoption/non-adoption notifying section 140 may notify the diagnosing apparatus 160 about adoption information indicating non-adoption for the control data from all of the controllers 100. The control data output section 142 may adopt a configuration to, at S350 above, output the pieces of control output data having the same value as the control output data in the immediately prior control period to the target device under control 155, output control output data extrapolated from the values of the control output data in a plurality of prior control periods to the target device under control 155, skip the output of the control output data, or the like.

Figure 4:
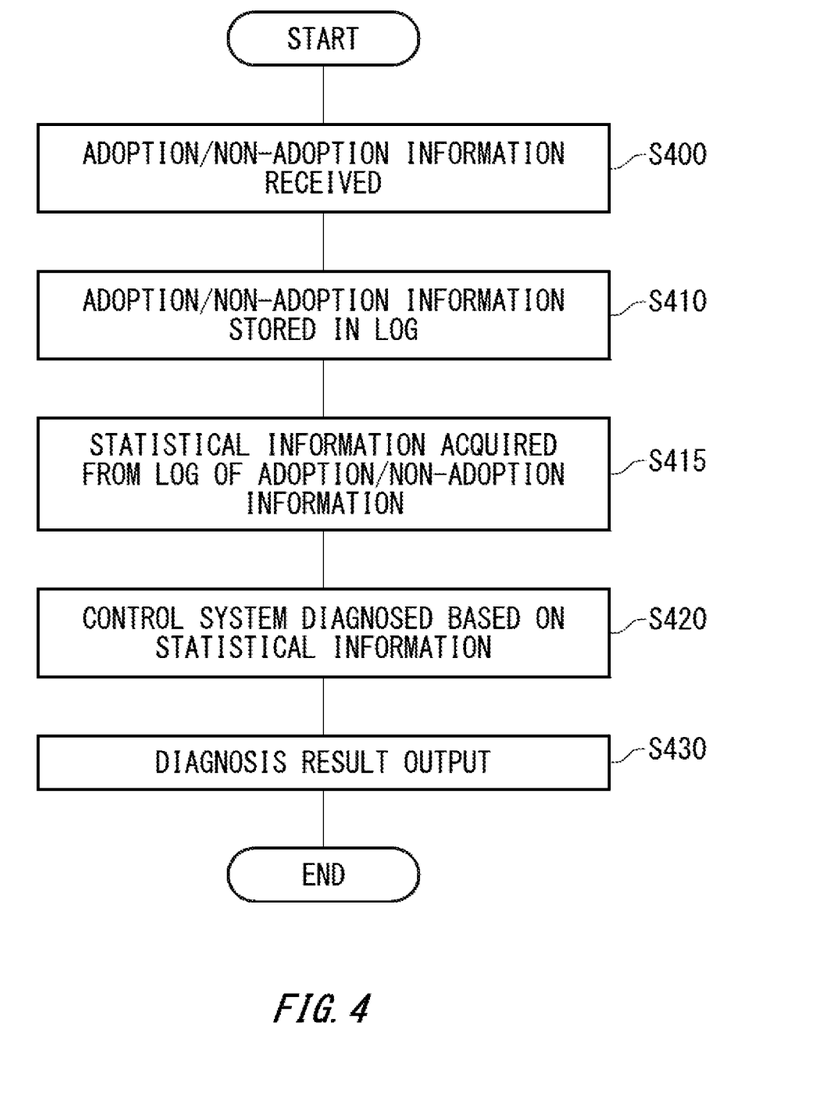
FIG. 4 shows an operational flow of the diagnosing apparatus 160 according to the present embodiment.

FIG. 4 shows an operational flow of the diagnosing apparatus 160 according to the present embodiment. As an example, this drawing shows the operational flow of the diagnosing apparatus 160 corresponding to one diagnostic period of the diagnosing apparatus 160. The diagnosing apparatus 160 may repeatedly perform the operational flow of this drawing each diagnostic period.

At S400, the adoption/non-adoption receiving section 162 receives the adoption/non-adoption information indicating adoption/non-adoption of the control data from each of the plurality of interface apparatuses 130. The adoption/non-adoption receiving section 162 may acquire the adoption/non-adoption information by issuing the adoption/non-adoption information read access or read request to the adoption/non-adoption notifying section 140 in the interface apparatus 130 with a suitable timing such as each diagnostic period. Instead, if each interface apparatus 130 adopts a configuration to actively transmit the adoption/non-adoption information with a predetermined timing such as each control period, the adoption/non-adoption receiving section 162 sequentially receives the adoption/non-adoption information transmitted thereto.

At S410, the adoption/non-adoption receiving section 162 adds the received adoption/non-adoption information to log information within the log DB 164. An exemplary configuration of the log information is described further below.

At S415, the statistical information acquiring section 165 acquires each type of statistical information to be used by the diagnosing section 168 in the diagnosis of the control system 10, from the log information of the adoption/non-adoption information stored in the log DB 164.

At S420, the diagnosing section 168 diagnoses the control system 10 based on the statistical information acquired by the statistical information acquiring section 165. The diagnosing section 168 may diagnose the control system 10 further based on the topology information of the network 50 recorded in the topology DB 166. In this diagnosis, the diagnosing section 168 estimates the abnormality location in the control system 10 and the degree or importance of the abnormality, based on the statistical information and, if necessary, the topology information. A specific example of the diagnosis performed by the diagnosing section 168 is described further below in relation to FIG. 5.

At step S430, the diagnosis result output section 170 outputs the diagnostic result of the diagnosing section 168. The diagnosis result output section 170 provides notification about the abnormalities of the control system 10 using various means such as displaying the estimated abnormality location, estimated abnormality importance, and the like within the control system 10 in an observation/management console and/or observation/management terminal used by a manager, operator, or the like of the control system 10; notifying the manager or operator of the control system 10 about the estimated abnormality location, estimated abnormality importance, and the like via electronic mail, SMS, or the like; and providing a warning about the abnormality at the estimated abnormality location using a warning lamp, warning alarm, or the like indicating an abnormality in each section, which are arranged near each section of the control system 10.

The diagnosis result output section 170 may notify another device about the information indicating a device (a controller 100, an interface apparatus 130, each path in the network 50, and the like) diagnosed to be abnormal in the control system 10. In this way, another device that has received the notification can avoid being affected by the abnormality by, for example, ignoring or not adopting the data received from the device that has been diagnosed as abnormal. As an example, the diagnosis result output section 170 may notify each interface apparatus 130 that a certain controller 100 has been diagnosed as abnormal. In this way, each interface apparatus 130 can set the control data from controllers 100 diagnosed as abnormal to not be adopted, regardless of the control data values.

Figure 5:
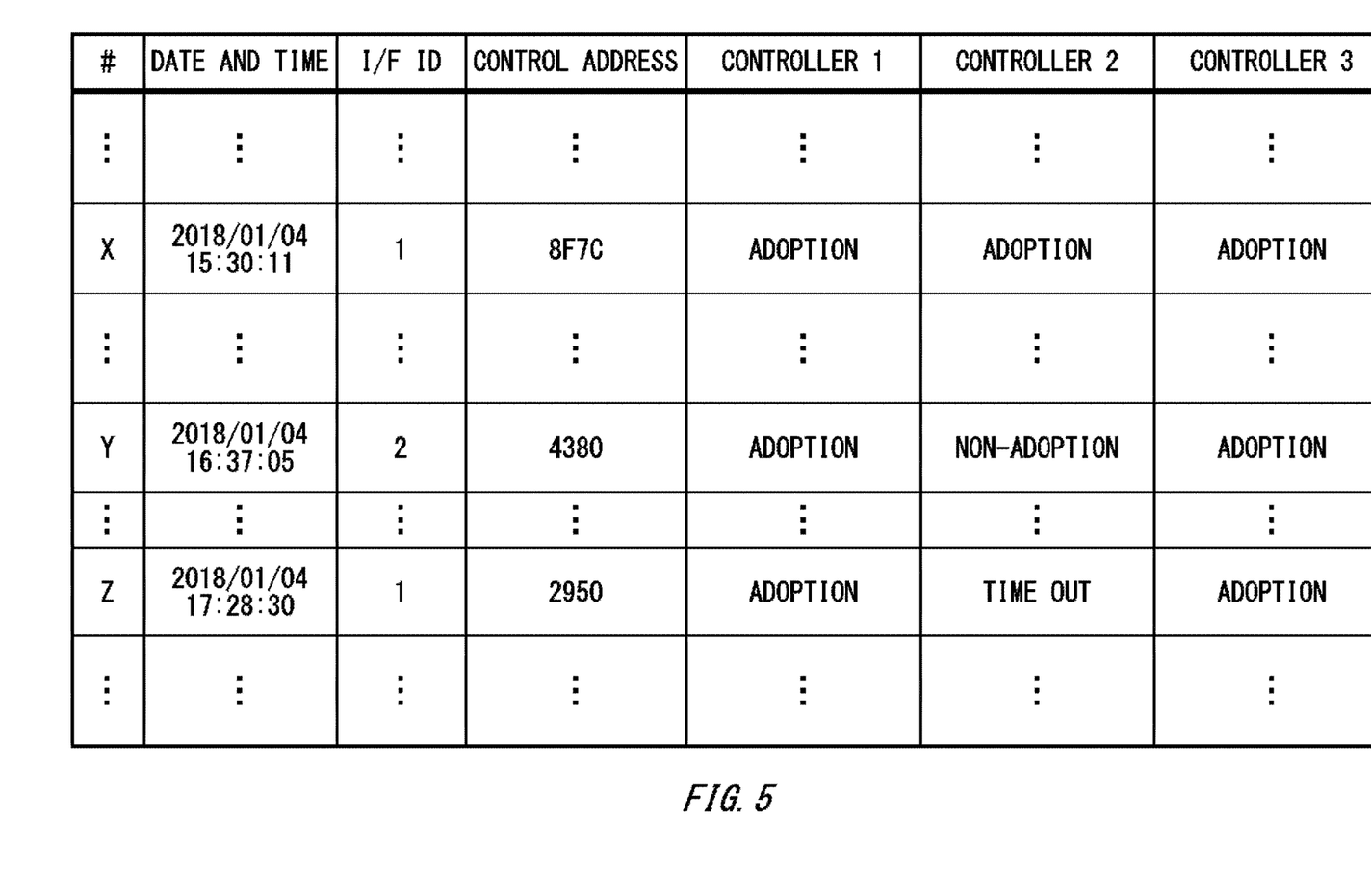
FIG. 5 shows an example of log information stored in the log DB 164 according to the present embodiment.

FIG. 5 shows an example of statistical information stored in the log DB 164 according to the present embodiment. The adoption/non-adoption receiving section 162 receives the adoption/non-adoption information from each interface apparatus 130, and consecutively stores this information in the log information shown in the drawing as an example.

The log information of this drawing contains a plurality of entries having data elements corresponding to each column including date and time, an interface apparatus ID ("I/F ID" in the drawing), a control address, and the adoption/non-adoption information of the control data from each controller ("controller 1", "controller 2", and "controller 3" in the drawing). The present drawing shows entry numbers ("#" in the drawing) further added to the head of the columns of the log information, for ease of explanation.

The "date and time" indicates the timing at which the adoption/non-adoption information is acquired from the adopting section 138 by the adoption/non-adoption notifying section 140, for example. Instead, the log DB 164 may record information relating to an arbitrary timing relating to the adoption/non-adoption information in the log information. For example, the log DB 164 may record a date and time such as a start timing, of a control period or identification information of the control period in the log information.

The "interface apparatus ID" and "control address" indicate the location of the control data relating to the adoption/non-adoption information in the control system 10. In the example of the present drawing, the location to which the control data is to be transmitted is designated by the pair of the identifier (ID) of the target interface apparatus 130 in the control system 10 and the address (control address) of the storage destination of the control data in the target interface apparatus 130. Here, the location to which the control data is to be transmitted may be designated using the identification information such as an address in the global address space of the control system 10, a register identifier (ID) in the global register space, or a pair of an identifier of the interface apparatus 130 and an address (register identifier) in the local address (register) space of this interface apparatus 130.

The "adoption/non-adoption information of the control data from each controller" indicates the adoption/non-adoption of the control data from each controller 100 for the location of the "control address" and "interface apparatus ID" at the timing indicated by the "date and time". In the drawing, the adoption/non-adoption of the control data is expressed as "adoption" if the control data is adopted, as "non-adoption" if the control data is not adopted, and as "time out" if the control data could not be received due to a time out. The control data that has timed out is treated as being non-adopted.

In the present drawing, the X-th entry shows that the control data from all (three) of the controllers 100 was adopted for the location identified by control address "8F7C" in the interface apparatus 130 whose interface apparatus ID is "1" and acquired "Jan. 4, 2018, 15:30:11". The Y-th entry shows that the control data from controllers 1 and 3 was adopted, and the control data from controller 2 was received by the interface apparatus 130 but was not adopted. The Z-th entry shows that the control data from controllers 1 and 3 was adopted, but the control data from controller 2 timed out and was not adopted.

The diagnosing section 168 may perform at least one of the diagnoses shown as examples below, using the statistical information acquired by the statistical information acquiring section 165 from the log information, (1) Controller 100 Abnormality Estimation 1

The statistical information acquiring section 165 obtains a statistic of the number of non-adopted pieces of control data of each controller 100, and the diagnosing section 168 estimates that there is the possibility of an abnormality in each controller 100 for which the number of non-adopted pieces of control data is greater than or equal to a first reference number of pieces. If the first reference number of pieces is one, in response to the control data being non-adopted one time, the diagnosing section 168 immediately estimates the controller 100 that has transmitted (or is to transmit) this control data to be abnormal. If the first reference number of pieces is two, on a condition that the non-adoption of data from a certain controller 100 occurs repeatedly or multiple times, the diagnosing section 168 estimates this controller 100 to be abnormal. In this way, the diagnosing section 168 can exclude non-adoption due to transient causes such as external noise caused by lightning strikes or the like, and estimate the abnormalities based on events occurring relatively constantly.

(2) Controller 100 Abnormality Estimation 2

If the control data from a certain controller 100 is non-adopted by a relatively large number of interface apparatuses 130, the possibility of the controller 100 that is the transmission source being abnormal becomes relatively high, and if the control data from a certain controller 100 is not adopted by only a relatively small number of interface apparatuses 130, the possibility of interface apparatuses 130 on the receiving side, and not the controller 100 that is the transmission source, being abnormal becomes relatively high. Therefore, in addition to the abnormality location determination condition of (1) described above, the diagnosing section 168 may estimate that there is the possibility of an abnormality in the controller 100 for which the number of non-adopted pieces of control data is greater than or equal to the first reference number of pieces, in each of a number of interface apparatuses 130 greater than or equal to a first reference number of apparatuses among the plurality of interface apparatuses 130, for example. In this case, the statistical information acquiring section 165 obtains the statistic of the number of non-adopted pieces of control data from each controller 100, in each interface apparatus 130. As an example, in a case where there are 100 interface apparatuses 130, for each of three (first reference number of apparatuses) or more interface apparatuses 130, if four (first reference number of pieces) or more pieces of the control data are not adopted, the diagnosing section 168 may estimate the controller 100 that is the transmission source of the control data to be abnormal.

(3) Interface Apparatus 130 Abnormality Estimation

In relation to (2) described above, if the control data from a certain controller 100 is not adopted by only a relatively small number of interface apparatuses 130, the diagnosing section 168 may estimate that there is a possibility of the interface apparatus 130 on the reception side being abnormal. In other words, for each of a number of interface apparatuses 130 less than a second reference number of apparatuses among the plurality of interface apparatuses 130, in response to a number of pieces of control data greater than or equal to a second reference number of pieces being non-adopted, the diagnosing section 168 may estimate that there is the possibility of the interface apparatus 130 on the reception side of the control data being abnormal. For example, for each of less than three (second reference number of apparatuses) interface apparatuses 130, in response to four (second reference number of pieces) or more pieces of control data being non-adopted, the diagnosing section 168 estimates that there is a possibility of the interface apparatus 130 on the reception side being abnormal. In this case, for each of the other interface apparatuses 130, the control data other than the pieces of control data numbering less than the second reference number of pieces (e.g. 4) is adopted. Here, the second reference number of apparatuses may be the same as the first reference number of apparatuses in (2) described above, or may instead be smaller or larger than the first reference number of apparatuses. If the second reference number of apparatuses is larger than the first reference number of apparatuses, the diagnosing section 168 may estimate that there is a possibility of both the controller 100 that is the transmission source, according to (2) described above, and the interface apparatus 130 on the reception side, according to (3), being abnormal.

(4) Network 50 Abnormality Estimation

If the number of pieces of control data transmitted by (or intended to be transmitted by) a certain link of the network 50 that are non-adopted is relatively large, among the pieces of control data transmitted from a plurality of controllers 100 to a plurality of interface apparatuses 130, there is a possibility that this link, among the plurality of links forming the network 50, is abnormal. For example, such an abnormality could be a case where a certain link is cut off and the control data is not adopted due to a time out caused by the control data not arriving at the destination, or a case where an error such as a bit error in the control data occurs in a certain link such that, despite arriving at the destination, the control data is not adopted. Therefore, for each combination of a controller 100 that is a transmission source and an interface apparatus 130 that is a destination, the statistical information acquiring section 165 may obtain a statistic of the number of non-adopted pieces of control data. The diagnosing section 168 may identify a path within the network 50 on which control data that is non-adopted in the statistical information is to be transmitted, using the topology information including information identifying one or more links provided between each controller 100 and each interface apparatus 130, and in response to the number of non-adopted pieces of control data that passed through a certain link being greater than or equal to a third reference number of pieces, estimate this link to be abnormal. In this estimation, the diagnosing section 168 may estimate cutoff of the link, using only the control data that was not adopted due to a time out as a target. Also in a case where the links are made redundant in a certain communication segment between a controller 100 and an interface apparatus 130, the diagnosing section 168 can estimate that at least one of the redundant links is abnormal by estimating the abnormality in a similar manner.

(5) Abnormality Estimation Using a Self-Diagnosis Result

If at least one interface apparatus 130 among the plurality of interface apparatuses 130 has a self-diagnosis function, the diagnosing section 168 may estimate the abnormality location in the control system 10 further based on the self-diagnosis result of the at least one interface apparatus 130. For example, in a case where the it has been estimated that there is a possibility of an abnormality in a certain controller 100 or a certain interface apparatus 130 based on the statistical information, if this interface apparatus 130 senses an abnormality as a result of the self-diagnosis, the diagnosing section 168 may estimate that there is an abnormality in this interface apparatus 130 without estimating that the controller 100 is abnormal. Furthermore, in a case where a certain interface apparatus 130 senses an abnormality as a result of the self-diagnosis, the diagnosing section 168 does not need to include the non-adoption of the control data of this interface apparatus 130 in the count for the conditional judgments of (1) to (4) and the like described above. Here, the diagnosing apparatus 160 may separately output information indicating that this interface apparatus 130 has an abnormal self-diagnosis result, as a diagnosis result. Similarly, at least one controller 100 among the plurality of controllers 100 may have a self-diagnosis function, and the diagnosing section 168 may estimate an abnormality further using the self-diagnosis result of the this controller 100. The controllers 100 and interface apparatuses 130 may adopt, as a self-diagnosis test, various tests such as a loop-back communication test and/or memory read/write test, for example.

In the above description, the statistical information acquiring section 165 may obtain a statistic that is the number of times that the control data is not adopted, by counting the pieces of adoption/non-adoption data in a range of a time window having a predetermined length. The diagnosing section 168 may then perform the judgment concerning whether there is a reference number of non-adoptions within the range of the time window. For example, if the control data was not adopted three or more times within a 1-hour time period, the diagnosing section 168 may estimate that the controller 100 that is the transmission source of this control data is abnormal. In other words, the diagnosing section 168 may perform the estimation described above on a condition that the non-adoption of the control data occurs with a frequency that is greater than or equal to a reference frequency. Furthermore, the statistical information acquiring section 165 may obtain a statistic such as the ratio of the number of times that control data is not adopted to the number of times that control data is transmitted, and the diagnosing section 168 may determine whether the reference number of non-adopted pieces of data has been reached according to the ratio of the number of non-adopted pieces of data to a number of pieces of control data serving as a base.

The diagnosing section 168 can estimate an abnormality location in the control system 10 based on various determination standards such as described in the example above, using the statistical information and, if necessary, the topology information and self-diagnosis results. Furthermore, the diagnosing section 168 may calculate or estimate the importance of an abnormality according to the number of occurrences (the actual number, frequency, or ratio) of abnormalities or non-adoptions relating to locations estimated to be abnormal.

Figure 6:
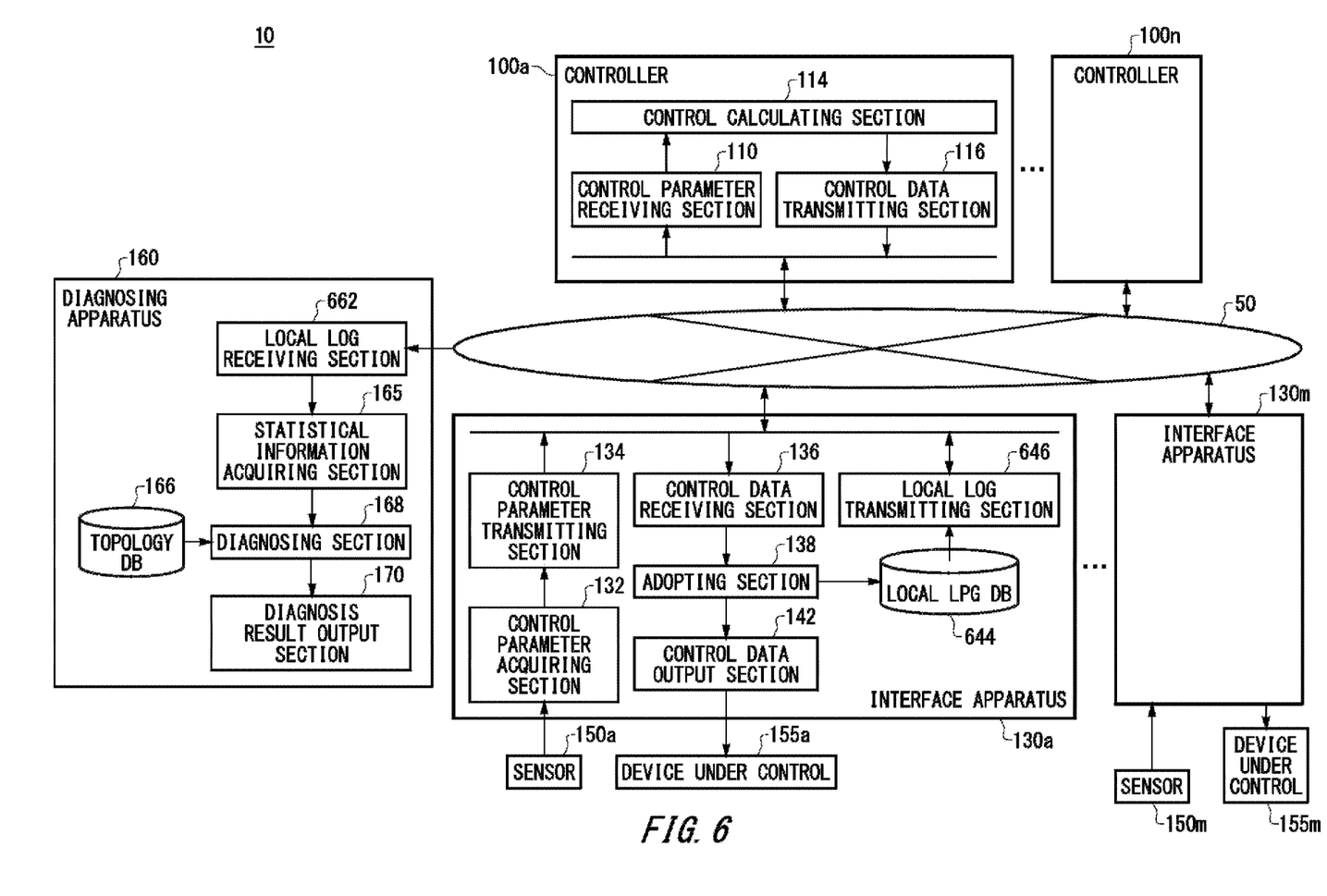
FIG. 6 shows a modification of the control system 10 according to the present embodiment.

FIG. 6 shows a modification of the control system 10 according to the present embodiment. In this drawing, components having the same reference numerals as in FIG. 1 have the same configuration and function as in FIG. 1, and therefore descriptions thereof are omitted unless especially necessary. In the control system 10 of the present drawing, instead of the adoption/non-adoption information transmitted by each interface apparatus 130 being accumulated in the log DB 164 by the diagnosing apparatus 160, each interface apparatus 130 locally accumulates the adoption/non-adoption information as local log information, and transmits this information to the diagnosing apparatus 160.

The interface apparatus 130 includes a local log DB 644 and a local log transmitting section 646, instead of the adoption/non-adoption notifying section 140. The local log DB 644 receives the adoption/non-adoption information of the control data from the adopting section 138, and consecutively stores this information as local log information of the interface apparatus 130. The local log transmitting section 646 transmits the local log information stored in the local log DB 644 to the diagnosing apparatus 160, in response to a request from the local log receiving section 662 in the diagnosing apparatus 160.

The diagnosing apparatus 160 includes a local log receiving section 662, instead of the adoption/non-adoption receiving section 162 and the log DB 164. The local log receiving section 662 receives each piece of local log information. At each diagnosis timing or diagnosis period, the local log receiving section 662 transmits read access or a read request to each interface apparatus 130 and reads the necessary portion of the local log information from each interface apparatus 130. Instead, the local log receiving section 662 may receive local statistical information transmitted by each local log transmitting section 646 at a suitable timing, such as periodically, and store this information therein as statistical information.

According to the control system 10 of the present modification, each interface apparatus 130 can store local log information until the diagnosing apparatus 160 performs the diagnosis, and therefore the diagnosing apparatus 160 or the interface apparatus 130 can select a suitable timing, according to the load of the network 50, to transmit the local log information.

In the present modification, each interface apparatus 130 may adopt a configuration including a local statistical information acquiring section that acquires the local statistical information included the adoption/non-adoption of the control data in each interface apparatus 130, based on the local log information in the local log DB 644. In this case, the interface apparatus 130 includes a local statistical information transmitting section that transmits the local statistical information to the diagnosing apparatus 160, instead of the local log transmitting section 646. Furthermore, the diagnosing apparatus 160 may include a local statistic receiving section that receives local statistical information, instead of the local log receiving section 662.

According to the control system 10 shown above, the diagnosing apparatus 160 can diagnose the entirety of the control system 10 and, even in a case where common or general devices are used as each controller 100, each interface apparatus 130, and the network 50, it is possible to increase the reliability of the control system 10.

Furthermore, according to the control system 10 shown above, the adoption/non-adoption of the control data from each controller 100 can be judged on the interface apparatus 130 side regardless of which controller 100 the control data is from. Therefore, it is possible to take a portion of the plurality of controllers 100 offline while the control system 10 is kept in an operating state. For example, it is possible to perform seamless operation of replacing or updating the OS or the like by sequentially stopping one controller 100 at a time among four controllers 100 while the control system 10 is operating and sequentially reactivating these controllers 100 to be back online.

The various embodiments of the present embodiment may be described with reference to flow charts and block diagrams, and these blocks may represent (1) a step of a process performed by an operator or (2) a section of an apparatus having a role of performing an operation. The specified steps and sections may be implemented by specialized circuitry, programmable circuitry that is supplied together with computer readable instructions stored on a computer readable medium, and/or processors supplied together with computer readable instructions stored on a computer readable medium. The specialized circuitry may include digital and/or analog hardware circuitry, and may include an integrated circuit (IC) and/or discrete circuit. The programmable circuitry may include reconfigurable hardware circuitry including logical AND, logical OR, logical XOR, logical NAND, logical NOR, and other logical operation circuitry and memory elements such as flip-flops, registers, field programmable gate arrays (FPGAs), and programmable logic arrays (PLAs).

The computer readable medium may include an arbitrary tangible device capable of storing instructions executed by a suitable device, and as a result, the computer readable medium having instructions stored thereon includes a product that contains instructions that can be executed in order to create means for performing the operations designated in the flow charts or block diagrams. Examples of the computer readable medium may include an electronic storage medium, a magnetic storage medium, an optical storage medium, an electromagnetic storage medium, a semiconductor storage medium, and the like. More specific examples of the computer readable medium include a floppy disk (Registered Trademark), a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-Ray™ disk, a memory stick, an integrated circuit card, and the like.

The computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA™, C++, etc., and conventional procedural programming languages, such as the "C" programming language or similar programming languages.

The computer readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer readable instructions to create means for performing operations specified in the flowcharts or block diagrams. Examples of processors include computer processors, processing units, microprocessors, digital signal processors, controllers, microcontrollers, etc.

Figure 7:
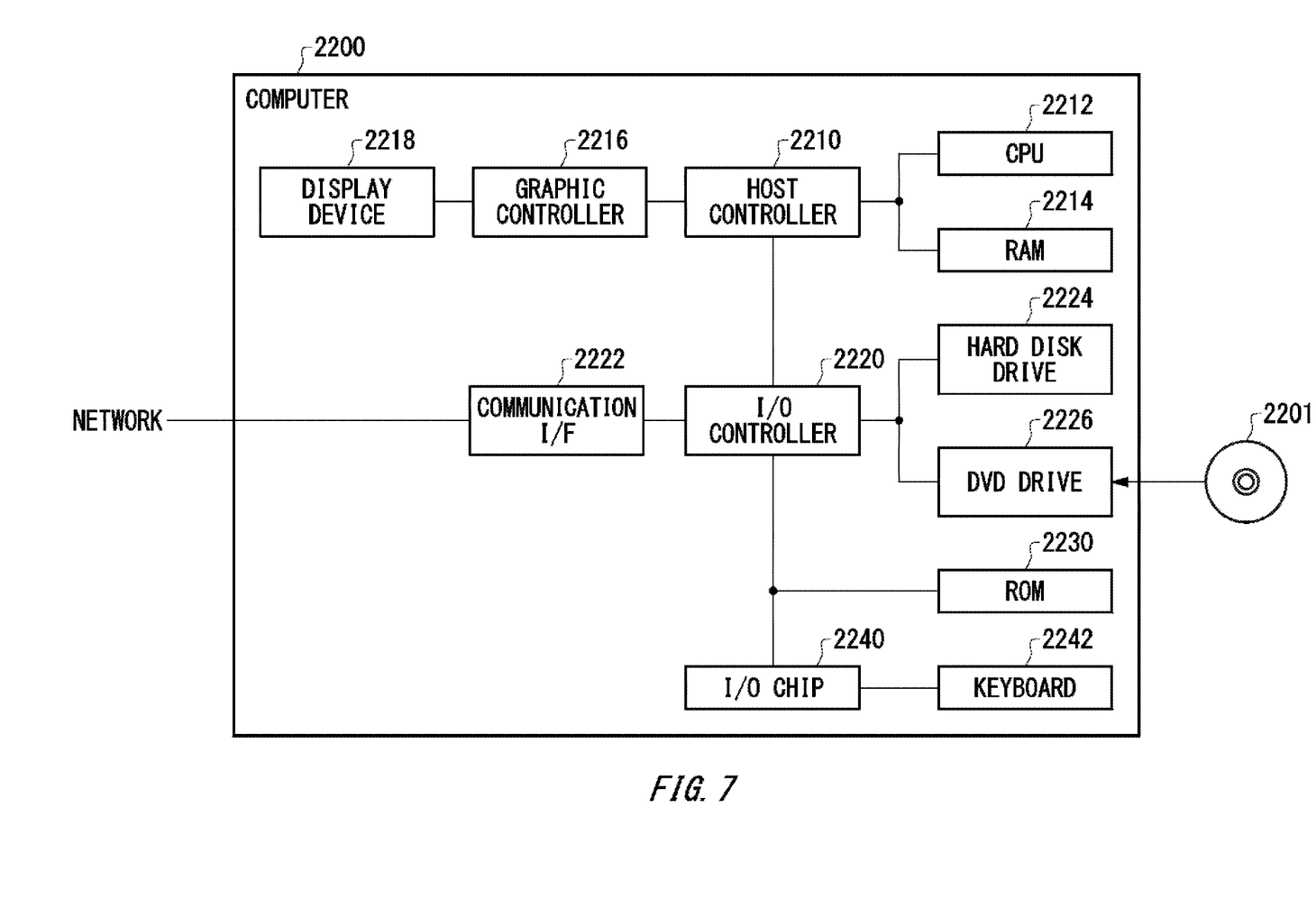
FIG. 7 shows an exemplary configuration of a computer 2200 according to the present embodiment.

FIG. 7 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in on the computer 2200 or in a computer readable medium near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, if a configuration is adopted in which the interface apparatus 130 can transmit control parameters having different values to a plurality of controllers 100 in the same control period, the controllers 100 may include synchronizing sections that supply the control calculating sections 114 of all of the controllers 100 with the same values for the same control parameters in the same control periods. Such a synchronizing section communicates with the synchronizing sections in other controllers 100 and obtains a majority determination of the control parameter values in each control period, for example, to be able to supply control parameters having the same value to each control calculating section 114 among a plurality of controllers 100 and perform the control calculation process based on the input of the same value to each control calculating section 114.

Furthermore, each controller 100 can adopt a configuration to operate asynchronously without using control parameters having the same value. In this case, even without performing the synchronization process, each controller 100 can output pieces of control data having values relatively close to each other as long as control parameters that change continuously to become closer values at closer timings are input thereto. Therefore, the interface apparatus 130 can obtain the average or the like of the control data from each controller 100, and set this average or the like as the control output data.

In this case, the adopting section 138 may set an average value, an average value excluding outlier values, a center value, a center value excluding outlier values, or a weighted average value of a plurality of pieces of control data as the control output data value. In this case, the adopting section 138 may set the pieces of control data having outlier values to be non-adopted, and even though a portion of the values are reflected in the control output data, the pieces of control data whose values are outside of a reference range determined in advance for the control output data value may be non-adopted. In an opposite manner, by setting an average value excluding the maximum value and minimum value of a plurality of pieces of control data as the control output data, for example, even though the maximum value and minimum value are not reflected in the control output data, as long as the maximum value and minimum value are within a reference range for the control output data value, the adopting section 138 may treat the corresponding control data as being adopted.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A diagnosing apparatus that is configured to diagnose a control system, wherein the control system includes:
   a plurality of controllers adopting a redundant configuration; and
   an interface apparatus that is configured to output control output data, which is based on a plurality of redundant pieces of control data received from the plurality of controllers, to a device under control, and
   the diagnosing apparatus comprises:
      a statistical information acquiring section that is configured to acquire statistical information including adoption/non-adoption of the control data from each of the plurality of controllers in the interface apparatus; and
      a diagnosing section that is configured to diagnose the control system based on the statistical information;
   wherein the control system includes a plurality of interface apparatuses, and each of the plurality of interface apparatuses is the interface apparatus, and the diagnosing section is configured to diagnose the control system based on the statistical information including adoption/non-adoption of the control data from each of the plurality of controllers in each of the plurality of interface apparatuses;
   wherein the control system further includes a network to which the plurality of controllers, the plurality of interface apparatuses, and the diagnosing apparatus are connected; and
   wherein the diagnosing section is configured to estimate that there is a possibility of an abnormality in a path of the network that does not adopt a number of pieces of the control data greater than or equal to a predetermined reference number of pieces.

2. The diagnosing apparatus according to claim 1, wherein the plurality of controllers each transmit the control data in synchronization with a predetermined control period, and the diagnosing section diagnoses the control system based on the statistical information including adoption/non-adoption of the control data in each of a plurality of control periods.

3. The diagnosing apparatus according to claim 1, wherein the diagnosing section estimates that there is a possibility of an abnormality in a controller for which a number of pieces of control data greater than or equal to a first reference number of pieces are not adopted, among the plurality of controllers in each of a number of interface apparatuses greater than or equal to a first reference number of apparatuses among the plurality of interface apparatuses.

4. The diagnosing apparatus according to claim 1, wherein the diagnosing section estimates that there is a possibility of an abnormality in an interface apparatus that does not adopt a number of pieces of control data greater than or equal to a second reference number of pieces, in response to the number of pieces of control data that are not adopted being greater than or equal to the second reference number of pieces, in each of a number of interface apparatuses less than a second reference number of apparatuses among the plurality of interface apparatuses.

5. The diagnosing apparatus according to claim 1, wherein
   at least one interface apparatus among the plurality of interface apparatuses has a self-diagnosing function, and
   the diagnosing section estimates an abnormality location in the control system further based on a self-diagnosis result of the at least one interface apparatus.

6. The diagnosing apparatus according to claim 1, further comprising:
   a topology database storing therein topology information of the network, wherein
   the diagnosing section estimates an abnormality location in the network based on the statistical information and the topology information.

7. A control system comprising:
   a plurality of controllers; an interface
   apparatus; and the diagnosing apparatus
   according to claim 1.

8. A diagnosing method for diagnosing a control system with a computer, wherein
   the control system includes:
      a plurality of controllers adopting a redundant configuration; and
      an interface apparatus that outputs control output data, which is based on a plurality of redundant pieces of control data received from the plurality of controllers, to a device under control, the computer acquires statistical information including adoption/non-adoption of the control data from each of the plurality of controllers in the interface apparatus, and the computer diagnoses the control system based on the statistical information;
wherein the control system includes a plurality of interface apparatuses, and each of the plurality of interface apparatuses is the interface apparatus, and the diagnosing section diagnoses the control system based on the statistical information including adoption/non-adoption of the control data from each of the plurality of controllers in each of the plurality of interface apparatuses;
wherein the control system further includes a network to which the plurality of controllers, the plurality of interface apparatuses, and the diagnosing apparatus are connected; and
wherein the diagnoses of the control system includes estimating that there is a possibility of an abnormality in a path of the network that does not adopt a number of pieces of the control data greater than or equal to a predetermined reference number of pieces.

9. The diagnosing method according to claim 8, wherein the computer diagnoses the control system based on the statistical information including adoption/non-adoption of the control data from each of the plurality of controllers in each of the plurality of interface apparatuses.

10. The diagnosing method according to claim 9, wherein the plurality of controllers each transmit the control data in synchronization with a predetermined control period, and
the computer diagnoses the control system based on the statistical information including adoption/non-adoption of the control data in each of a plurality of control periods.

11. The diagnosing method according to claim 9, wherein the computer estimates that there is a possibility of an abnormality in a controller for which a number of pieces of control data greater than or equal to a first reference number of pieces are not adopted, among the plurality of controllers in each of a number of interface apparatuses greater than or equal to a first reference number of apparatuses among the plurality of interface apparatuses.

12. The diagnosing method according to claim 9, wherein the computer estimates that there is a possibility of an abnormality in an interface apparatus that does not adopt a number of pieces of control data greater than or equal to a second reference number of pieces, in response to the number of pieces of control data that are not adopted being greater than or equal to the second reference number of pieces, in each of a number of interface apparatuses less than a second reference number of apparatuses among the plurality of interface apparatuses.

13. A non-transitory computer readable medium on which is stored a diagnosing program that causes a computer to function as a diagnosing apparatus that diagnoses a control system, wherein
the control system includes:
a plurality of controllers adopting a redundant configuration; and an interface apparatus that outputs control output data, which is based on a plurality of redundant pieces of control data received from the plurality of controllers, to a device under control, and
the diagnosing program causes the computer to function as:
a statistical information acquiring section that acquires statistical information including adoption/non-adoption of the control data from each of the plurality of controllers in the interface apparatus, and a diagnosing section that diagnoses the control system based on the statistical information;
wherein the control system includes a plurality of interface apparatuses, and each of the plurality of interface apparatuses is the interface apparatus, and the diagnosing section diagnoses the control system based on the statistical information including adoption/non-adoption of the control data from each of the plurality of controllers in each of the plurality of interface apparatuses;
wherein the plurality of controllers each transmit the control data in synchronization with a predetermined control period, and
the diagnosing section diagnoses the control system based on the statistical information including adoption/non-adoption of the control data in each of a plurality of control periods; and
wherein the diagnosing section estimates that there is a possibility of an abnormality in a path of the network that does not adopt a number of pieces of the control data greater than or equal to a predetermined reference number of pieces.

14. The non-transitory computer readable medium according to claim 13, wherein
the plurality of controllers each transmit the control data in synchronization with a predetermined control period, and
the diagnosing section diagnoses the control system based on the statistical information including adoption/non-adoption of the control data in each of a plurality of control periods.

15. The non-transitory computer readable medium according to claim 13, wherein
the diagnosing section estimates that there is a possibility of an abnormality in a controller for which a number of pieces of control data greater than or equal to a first reference number of pieces are not adopted, among the plurality of controllers in each of a number of interface apparatuses greater than or equal to a first reference number of apparatuses among the plurality of interface apparatuses.

16. The non-transitory computer readable medium according to claim 13, wherein
the diagnosing section estimates that there is a possibility of an abnormality in an interface apparatus that does not adopt a number of pieces of control data greater than or equal to a second reference number of pieces, in response to the number of pieces of control data that are not adopted being greater than or equal to the second reference number of pieces, in each of a number of interface apparatuses less than a second reference number of apparatuses among the plurality of interface apparatuses.

* * * * *